United States Patent [19]

Baker

[11] Patent Number: 4,504,275

[45] Date of Patent: Mar. 12, 1985

[54] EMULSIFYING AGENTS

[75] Inventor: Alan S. Baker, Slough, England

[73] Assignee: Imperial Chemical Industries PLC, London, England

[21] Appl. No.: 478,480

[22] Filed: Mar. 24, 1983

[51] Int. Cl.³ .................................................. C10L 1/32
[52] U.S. Cl. ............................................ 44/51; 44/56; 252/356
[58] Field of Search ............... 44/51, 53, 56, 57, 78; 252/352, 356

[56] References Cited

U.S. PATENT DOCUMENTS

| | | | |
|---|---|---|---|
| 3,346,494 | 10/1967 | Robbins et al. | 44/51 |
| 3,437,465 | 4/1969 | Lesuer | 44/51 |
| 3,527,581 | 9/1970 | Brownawell et al. | 44/51 |
| 4,347,061 | 8/1982 | Madsen et al. | 44/51 |

FOREIGN PATENT DOCUMENTS 53-0136008 11/1978 Japan ........................................ 44/51

Primary Examiner—William R. Dixon, Jr.
Assistant Examiner—Margaret B. Medley
Attorney, Agent, or Firm—Cushman, Darby & Cushman

[57] ABSTRACT

Surfactant compositions suitable for the emulsification of methanol or ethanol in hydrocarbon liquids, especially diesel oil, consist of a blend of (i) from 10% to 90% by weight of a block or graft copolymer in which one polymeric component is the residue of an oil-soluble complex monocarboxylic acid and another polymeric component is the residue of a water-soluble polyalkylene glycol or polyalkyleneoxy polyol and (ii) from 90% to 10% by weight of a conventional non-ionic surfactant having an HLB value in the range 11.0 to 18.0.

12 Claims, No Drawings

EMULSIFYING AGENTS

This invention relates to novel surfactant compositions which are useful in the production of emulsions of polar liquids in hydrocarbon liquids, in particular of emulsions of methanol and ethanol in hydrocarbon fuels such as diesel oil.

It has been widely proposed, as a way of extending the available reserves of fossil hydrocarbon fuels, to blend petrol or gasoline with minor proportions of ethanol or, to a lesser extent, methanol, these alcohols being in principle obtainable from renewable natural resources. It would likewise be desirable to blend methanol or ethanol with heavier hydrocarbon fuel fractions, such as diesel oil, gas oil and fuel oil, but, in contrast to the situation with petrol or gasoline where the dry alcohol blends are in most cases homogeneous and are therefore straightforward to prepare, problems are encountered in producing the blends with the heavier fractions. On the one hand, the limited miscibility of methanol or ethanol with these fractions means that surface-active additives are required in order to stabilise the blends as emulsions; on the other hand, the fact that both of these alcohols are soluble to some extent in the hydrocarbon liquids in question and vice versa, means that conventional surfactants are not very effective for this purpose.

According to published British Application No. 2 051 124A, an emulsion of 20% by weight of methanol, 79% by weight of diesel oil and 1% of emulsifier can be prepared when the emulsifier is a block or graft copolymer of the type having the general formula (A—COO)$_m$B, wherein m is an integer of at least 2, each polymer component A has a molecular weight of at least 500 and is the residue of an oil-soluble complex monocarboxylic acid, and where each polymer component B has a molecular weight of at least 500, and, if m is equal to 2, is the divalent residue of a water-soluble polyalkylene glycol and, if m is higher than 2, is a residue having the valency m of a water-soluble polyether polyol. The emulsion obtained has, however, only a limited stability.

According to published British Appln. No. 2 002 400A, blends of the above-mentioned block or graft copolymers with conventional surfactants, such as the condensate of nonylphenol with 4 molar proportions of ethylene oxide, are useful for the emulsification of water in hydrocarbon fuel oils and Example 7 of the said application illustrates the case where methanol is additionally present in the disperse phase of the emulsion in order to confer greater stability of the emulsion towards low temperatures. However, in this case the methanol/water mixture contained 75% by weight of water.

We have now found that emulsions of much improved stability of methanol or ethanol, particularly in the heavier hydrocarbon fuel fractions, can be made more readily with the aid of a blend of a block copolymer as above described with a specified class of conventional surfactant distinguished from the conventional surfactants referred to in British Appln. 2 002 400A.

The present invention accordingly provides a surfactant composition suitable for the emulsification of methanol or ethanol in a hydrocarbon liquid, the composition being a blend of:

(i) from 10% to 90% by weight of a block or graft copolymer having the general formula (A—COO)$_m$—B, wherein m is an integer at least 2, wherein each polymeric component A has a molecular weight of at least 500 and is the residue of an oil-soluble complex monocarboxylic acid having the general structural formula

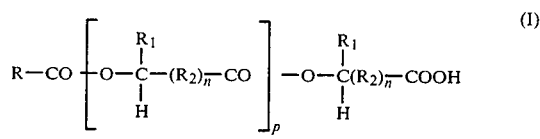

in which

R is hydrogen or a monovalent hydrocarbon or substituted hydrocarbon group;
R$_1$ is hydrogen or a monovalent C$_1$ to C$_{24}$ hydrocarbon group;
R$_2$ is a divalent C$_1$ to C$_{24}$ hydrocarbon group;
n is zero or 1;
p is an integer from zero up to 200;
and wherein each polymeric component B has a molecular weight of at least 500 and, in the case where m is 2, is the divalent residue of a water-soluble polyalkylene glycol having the general formula

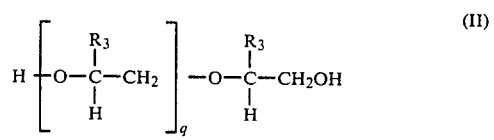

in which

R$_3$ is hydrogen or a C$_1$ to C$_3$ alkyl group;
q is an integer from 10 up to 500;
or in the case where m is greater than 2, is the residue of valency m of a water-soluble polyether polyol having the general formula

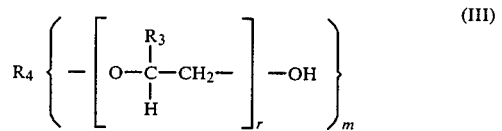

in which

R$_3$ and m have their previous significance;
r is zero or an integer from 1 to 500, provided that the total number of

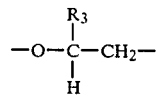

units in the molecule is at least 10;
R$_4$ is the residue of an organic compound containing in the molecule m hydrogen atoms reactive with an alkylene oxide;

with (ii) from 90% to 10% by weight of a conventional non-ionic surfactant in which the oil-soluble component has a molecular weight below 500 and which has an HLB value in the range 11.0 to 18.0.

Block or graft copolymers as hereinabove defined are more fully described in the afore-mentioned British Appln. No. 2 002 400A and reference may be made thereto for details of their composition and the manner in which they may be prepared.

By a conventional non-ionic surfactant we mean a substance containing in the molecule at least one non-ionic water-soluble component and at least one non-ionic oil-soluble (i.e. hydrocarbon-soluble) component, wherein both components are at most oligomeric in character and, in particular, wherein the hydrocarbon-soluble component has a molecular weight below 500, preferably below 350. Preferably, the surfactant has an HLB value in the range 11.4 to 16.7.

"HLB" stands for "Hydrophile-Lipophile Balance" and is a measure of the relative proportions of water-soluble and oil-soluble components in a surfactant: see Griffin, W. C., J. Soc. Cosmetic Chemists 1949, 1, 311 and "Emulsions: Theory and Practice", p.232 ff (P. Becher, Reinhold, 1965). HLB values for non-ionic surfactants can range from a minimum of zero to a maximum of 20.

In the blends of the block copolymers and conventional surfactants described in British Appln. No. 2 002 400A, none of the conventional surfactants shown has an HLB value greater than 10.9.

Preferred block or graft copolymers are those in which m in the above formula (I) has a value of 2 and the water-soluble polyalkylene glycol from which the polymeric component B is derived is a polyethylene glycol of molecular weight in the range 1000–4000. It is further preferred that the copolymer should contain from 20% to 50% by weight, especially from 30% to 45% by weight, of the polyethylene glycol-derived polymeric component B; otherwise expressed, the copolymer should preferably have an HLB value in the range 4 to 10, especially 6 to 9.

Preferred conventional surfactants are the ethylene oxide condensates of alcohols or phenols, such as sorbitan monooleate or p-nonylphenol, the weight proportion of poly(oxyethylene) chains present being such as to correspond to an HLB value in the range hereinabove defined.

The relative proportions, in the compositions of the invention, of the block or graft copolymer (i) and the conventional surfactant (ii) may vary, within the broad ranges defined above, according to the particular nature of the two phases which are to be emulsified, but illustrations of individual constituents (i) and (ii) and of the compositions of blends thereof, are given for general guidance in Tables I, II and III below.

TABLE I

| Block Copolymer | 'A' Block Composition | Wt. % | 'B' Block Composition | Wt. % | HLB Value |
|---|---|---|---|---|---|
| Q | Poly(12-hydroxystearic acid) | 70 | Polyethylene glycol | 30 | 6.0 |
| S | Poly(12-hydroxystearic acid) | 60 | Polyethylene glycol | 40 | 8.0 |
| T | Poly(12-hydroxystearic acid) | 55 | Polyethylene glycol | 45 | 9.0 |

TABLE II

| Conventional Surfactant | Composition | HLB Value |
|---|---|---|
| I | Sorbitan monooleate + 20 mols ethylene oxide | 15.0 |
| II | Sorbitan monostearate + 20 mols ethylene oxide | 14.9 |
| III | Sorbitan monolaurate + 20 mols ethylene oxide | 16.7 |
| IV | Nonyl phenol + 20 mols ethylene oxide | 16.0 |
| V | Nonyl phenol + 15 mols ethylene oxide | 15.0 |
| VI | $C_{13-15}$ aliphatic alcohol + 9 mols ethylene oxide | 12.5 |
| VII | Non-ionic surfactant G-1096 (Atlas Chemicals) | 11.4 |
| VIII | Non-ionic surfactant G-1288 (Atlas Chemicals) | 16.0 |

TABLE III

| Blend No. | Block Copolymer | % by wt | Conventional Surfactant | % by wt |
|---|---|---|---|---|
| 1 | Q | 80 | I | 20 |
| 2 | Q | 50 | I | 50 |
| 3 | Q | 20 | I | 80 |
| 4 | S | 80 | III | 20 |
| 5 | S | 66.7 | I | 33.3 |
| 6 | S | 50 | I | 50 |
| 7 | S | 50 | II | 50 |
| 8 | S | 50 | III | 50 |
| 9 | S | 50 | IV | 50 |
| 10 | S | 50 | V | 50 |
| 11 | S | 50 | VI | 50 |
| 12 | S | 50 | VII | 50 |
| 13 | S | 50 | VIII | 50 |
| 14 | S | 20 | III | 80 |
| 15 | T | 50 | I | 50 |

According to a further aspect of the present invention, there is provided an emulsion of methanol or ethanol in a liquid hydrocarbon fuel, the emulsion containing from 1% to 75% by weight of methanol or ethanol as the disperse phase and from 25% to 99% by weight of the hydrocarbon fuel as the continuous phase, and in addition, as emulsifying agent, from 1% to 100% by weight, based on the disperse phase, of a surfactant composition as hereinabove defined. From a practical point of view, particular interest centres around emulsions which contain from 5% to 60% of methanol or ethanol and from 40% to 95% of hydrocarbon fuel, since the fuel value of the emulsions falls off steadily with increasing alcohol content and the viscosity rises as the disperse phase volume increases.

Hydrocarbon fuels in which methanol or ethanol may be emulsified according to the invention include, for example, commercial grade diesel oil, '35 seconds' gas oil, No. 3. fuel oil, commercial grade '2-star' petrol and commercial grade mineral oil (having a viscosity of 60 centistokes at 40° C.).

Although the disperse phase of the emulsions may consist of essentially pure methanol or ethanol, emulsions of practical interest may be obtained according to the invention in which the methanol or ethanol contains up to 20% of its weight of water. In commercial application, water contents in the range 5–10% by weight may commonly be encountered. In general, where the water content of the methanol or ethanol is low, it is preferred to employ, as the block or graft copolymer constituent of the surfactant composition, a copolymer having an HLB value towards the upper end of the preferred range previously referred to, viz. a value in the region of 8–9; conversely, where the methanol or ethanol contains proportions of water approaching the maximum of 20%, it is preferred to use a block or graft copolymer having a lower HLB value, in the region of 6.

The proportion of the surfactant composition employed to the total amount of the emulsion will vary, within the broad range stated above, not only according to the nature and relative proportions of the two constituents of the surfactant blend but also according to whether it is methanol or ethanol that is to be emulsified and according to the water content of the alcohol. In general, the higher the water content, the easier it becomes to emulsify the alcohol because of the greater degree of its immiscibility with the hydrocarbon. With methanol, or with ethanol containing 5% or more of water, stable emulsions are readily formed in diesel oil using a proportion of the surfactant composition in the range 1% to 20%, preferably 3% to 10% and more preferably in the region of 5%, by weight of the alcohol phase. However, with certain combinations, for example that of ethanol containing less than 5% of water with diesel oil, where the disperse phase has a significant but finite degree of miscibility with the continuous phase, it may be necessary to use an amount of the surfactant composition which approaches the actual amount of the alcohol in the mixture, if stable products are to be obtained. These products differ from the other emulsions according to the invention, which are characteristically turbid and contain disperse phase droplets of a size in the region of 0.1 micron or more, in being only slightly hazy or even completely clear, like a solution. The physical state of the alcohol constituent in these cases is not completely elucidated, but it is evident that the average size of the disperse phase droplets must be very small, perhaps of the order of a few tens or hundreds of Ångström units only; for convenience these products may be referred to as "microemulsions".

The optimum surfactant composition for any particular system to be emulsified can, however, readily be ascertained by simple experiment.

The emulsions according to the invention are conveniently produced by first dissolving or dispersing the selected emulsifier blend in the hydrocarbon liquid, with the aid of gentle heating where necessary. The alcohol phase is then added, initially under low speed mixing conditions and if necessary subsequently at high speed for a period of 1–2 minutes, ensuring that the temperature does not exceed a value at which significant evaporation of the alcohol phase occurs, e.g. about 40° C. The resulting emulsion is considered to be stable if no more than slight separation of either phase is detectable after 5 days' storage at ambient temperature, any separation being redispersible by gentle agitation.

There may, if desired, be present in the emulsions of the invention conventional fuel additives. Thus, for example, there may be incorporated in the alcohol phase of a diesel oil emulsion a lubricant whereby seizing of the fuel injection pump of an engine powered by the emulsion may be prevented.

The invention is illustrated but not limited by the following Examples, in which parts, ratios and percentages are by weight.

EXAMPLES

General Procedure

The block or graft copolymer constituent and the conventional surfactant, as identified in detail below, were blended together and then dissolved or dispersed in the hydrocarbon liquid, with the assistance of mild heat where necessary (not exceeding a temperature of 50° C.). The alcohol phase, as identified below, was then added to the hydrocarbon phase with low speed mixing, followed where necessary by high speed mixing for 1–2 minutes.

EXAMPLE 1

"Microemulsion" of 99% ethanol in diesel oil

Diesel oil (80 parts), blend 12 (see Table III) (20 parts), and 99% ethanol (20 parts) were mixed together with hand stirring. A stable, almost clear microemulsion was obtained.

EXAMPLE 2

Emulsions of 95% ethanol in diesel oil

95% Ethanol (20 parts) was added to diesel oil (79 parts) containing blend 11 (1 part) according to the general procedure outlined above. A stable emulsion was obtained. Similar results were obtained when blend 11 was replaced by an equal weight of blend or blend 9.

EXAMPLE 3

Emulsions of 90% ethanol in gas oil and diesel oil (a) 90% Ethanol (20 parts) was added to 35" gas oil (79 parts) containing blend 2 (1 part), according to the general procedure. A stable emulsion was obtained.

(b) 90% Ethanol (20 parts) was added to diesel oil (79 parts) containing blend 6 (1 part). A stable emulsion was obtained.

EXAMPLE 4

Emulsions of 80% ethanol in diesel oil

80% Ethanol (20 parts) was emulsified with diesel oil (79 parts) containing blend 4 (1 part), following the general procedure. A stable emulsion was obtained. Similar results were obtained when blend 4 as replaced by an equal weight of blend 8 or blend 14.

EXAMPLE 5

Emulsions of 100% methanol in diesel oil (a) Methanol (20 parts) was emulsified into diesel oil (79 parts) containing blend 5 (1 part), according to the general procedure. A stable emulsion was obtained. Similar results were obtained on replacing blend 5 by an equal weight of each of the following blends in turn: blend 8; blend 9; blend 11; blend 13; blend 15.

(b) Methanol (50 parts) was emulsified into diesel oil (47.5 parts) containing blend 2 (2.5 parts), according to the general procedure. A stable emulsion resulted.

EXAMPLE 6

Emulsion of 100% methanol in gas oil

Methanol (20 parts) was emulsified into 35" gas oil (79 parts) containing blend 10 (1 part), following the general procedure. A stable emulsion was obtained.

EXAMPLE 7

Emulsions of 90% methanol in diesel oil

90% Methanol (20 parts) was emulsified into diesel oil (79 parts) containing blend 2 (1 part), according to the general procedure. A stable emulsion was obtained, and a similar result was given when blend 2 was replaced by an equal weight of blend 3.

EXAMPLE 8

Emulsion of 80% methanol in diesel oil

80% methanol (20 parts) was emulsified into diesel oil (79 parts) containing blend 1 (1 part), following the general procedure. A stable emulsion resulted.

What we claim is:

1. A surfactant composition suitable for the emulsification of methanol or ethanol in a hydrocarbon liquid, the composition being a blend of:
(i) from 10% to 90% by weight of a block or graft copolymer having the general formula (A—COO)-$_m$—B, wherein m is an integer at least 2, wherein each polymeric component A has a molecular weight of at least 500 and is the residue of an oil-soluble complex monocarboxylic acid having the general structural formula

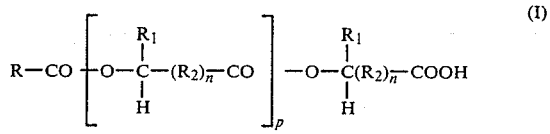

in which
R is hydrogen or a monovalent hydrocarbon or substituted hydrocarbon group;
$R_1$ is hydrogen or a monovalent $C_1$ to $C_{24}$ hydrocarbon group;
$R_2$ is a divalent $C_1$ to $C_{24}$ hydrocarbon group;
n is zero or 1;
p is an integer from zero up to 200;
and wherein each polymeric component B has a molecular weight of at least 500 and, in the case where m is 2, is the divalent residue of a water-soluble polyalkylene glycol having the general formula

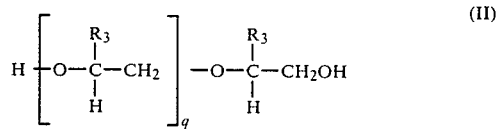

in which
$R_3$ is hydrogen or a $C_1$ to $C_3$ alkyl group;
q is an integer from 10 up to 500;
or in the case where m is greater than 2, is the residue of valency m of a water-soluble polyether polyol having the general formula

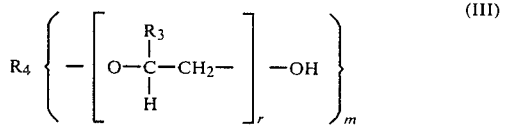

in which $R_3$ and m have their previous significance;
r is zero or an integer from 1 to 500, provided that the total number of

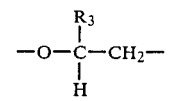

units in the molecule is at least 10;
$R_4$ is the residue of an organic compound containing in the molecule m hydrogen atoms reactive with a alkylene oxide;
with (ii) from 90% to 10% by weight of a conventional non-ionic surfactant in which the oil-soluble component has a molecular weight below 500 and which has an HLB value in the range 11.0 to 18.0.

2. A composition as claimed in claim 1, wherein the oil-soluble component of the conventional surfactant has a molecular weight below 350.

3. A composition as claimed in claim 1, wherein the conventional surfactant has an HLB value in the range 11.4 to 16.7.

4. A composition as claimed in claim 1, wherein the block or graft copolymer is one according to formula (I) where M has a value of 2 and the water-soluble polyalkylene glycol from which the polymeric component B is derived is a polyethylene glycol of molecular weight in the range 1000-4000.

5. A composition as claimed in claim 1, wherein the copolymer contains from 20% to 50% by weight of the polyethylene glycol-derived polymeric component B, that is to say, the copolymer has an HLB value in the range 4 to 10.

6. A composition as claimed in claim 5, wherein the copolymer contains from 30% to 45% by weight of the polyethylene glycol-derived polymeric component B, that is to say, the copolymer has an HLB value in the range 6 to 9.

7. A composition as claimed in claim 1, wherein the polymeric component A of the block or graft copolymer is the residue of poly(12-hydroxystearic acid).

8. A composition as claimed in claim 1, wherein the conventional surfactant is the ethylene oxide condensate of an alcohol or phenol.

9. An emulsion of methanol or ethanol in a liquid hydrocarbon fuel, the emulsion containing from 1% to 75% by weight of methanol or ethanol as the disperse phase and from 25% to 99% by weight of the hydrocarbon fuel as the continuous phase, and in addition, as emulsifying agent, from 1% to 100% by weight, based on the disperse phase, of a surfactant composition as claimed in claim 1.

10. An emulsion as claimed in claim 9, containing from 5% to 60% of methanol or ethanol and from 40% to 95% of hydrocarbon fuel.

11. An emulsion as claimed in claim 9, wherein the hydrocarbon fuel is a commercial grade diesel oil.

12. An emulsion as claimed in claim 9, wherein the methanol or ethanol contains up to 20% of its weight of water.

* * * * *